(12) United States Patent
Huang et al.

(10) Patent No.: US 11,521,118 B2
(45) Date of Patent: Dec. 6, 2022

(54) METHOD AND APPARATUS FOR GENERATING TRAINING DATA FOR VQA SYSTEM, AND MEDIUM

(71) Applicant: BEIJING BAIDU NETCOM SCIENCE AND TECHNOLOGY CO., LTD., Beijing (CN)

(72) Inventors: Pingping Huang, Beijing (CN); Min Qiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 725 days.

(21) Appl. No.: 16/534,036

(22) Filed: Aug. 7, 2019

(65) Prior Publication Data

US 2020/0104742 A1    Apr. 2, 2020

(30) Foreign Application Priority Data

Sep. 27, 2018   (CN) .......................... 201811134016.6

(51) Int. Cl.
  *G06N 20/00*   (2019.01)
  *G06F 16/33*   (2019.01)
  (Continued)

(52) U.S. Cl.
  CPC ......... *G06N 20/00* (2019.01); *G06F 16/3344* (2019.01); *G06K 9/6257* (2013.01);
  (Continued)

(58) Field of Classification Search
  USPC ............................................ 707/611; 706/11
  See application file for complete search history.

(56) References Cited

U.S. PATENT DOCUMENTS

| | | | |
|---|---|---|---|
| 2015/0178623 A1 | 6/2015 | Balani et al. | |
| 2016/0306846 A1* | 10/2016 | Adams, Jr. | .......... G06F 16/2423 |
| 2016/0342895 A1* | 11/2016 | Gao | ...................... G06N 3/0445 |

FOREIGN PATENT DOCUMENTS

| | | |
|---|---|---|
| CN | 104572998 A | 4/2015 |
| CN | 105630887 A | 6/2016 |

(Continued)

OTHER PUBLICATIONS

Office Action for Chinese Application No. 201811134016.6, dated Jun. 29, 2020, 16 pages.

(Continued)

*Primary Examiner* — Cam Linh T Nguyen
(74) *Attorney, Agent, or Firm* — Fay Sharpe LLP (57) ABSTRACT

Embodiments of the present disclosure are directed to a method and an apparatus for generating training data for a visual question answering (VQA) system, and a computer readable medium. The method for generating training data for a visual question answering system includes: obtaining a first set of training data of the visual question answering system, the first set of training data comprising a first question for an image in the visual question answering system and a first answer corresponding to the first question; obtaining information related to the image; generating a second question corresponding to the first answer based on the information to obtain a second set of training data for the image in the visual question answering system, the second set of training data comprising the second question and the first answer.

17 Claims, 3 Drawing Sheets

(51) Int. Cl.
  *G06K 9/62* (2022.01)
  *G06N 3/00* (2006.01)
  *G06V 20/00* (2022.01)
  *G06V 30/262* (2022.01)

(52) U.S. Cl.
  CPC ............. *G06N 3/004* (2013.01); *G06V 20/00* (2022.01); *G06V 30/274* (2022.01)

(56) References Cited

FOREIGN PATENT DOCUMENTS

| | | |
|---|---|---|
| CN | 106339756 A | 1/2017 |
| JP | 2017091525 A | 5/2017 |
| KR | 20170043582 A | 4/2017 |
| KR | 20180027278 A | 3/2018 |

OTHER PUBLICATIONS

Office Action for Japanese Application No. 2019131052, dated Sep. 2, 2020, 13 pages.
Li, et al., "Visual Question Generation as Dual Task of Visual Question Answering", Association for the Advancement of Artificial Intelligence, 2018.
EP 19191673.3, Extended European Search Report, dated Oct. 30, 2019.
Office Action for Korean application No. 10-2019-0109836, dated Nov. 23, 2020, 6 pages.
English translation of Office Action for Korean application No. 10-2019-0109836, dated Nov. 23, 2020, 5 pages.
Li et al., "Visual Question Generation as Dual Task of Visual Question Answering", Proceedings of the IEEE Conference on Computer Vision and Pattern Recognition, Jun. 2018, pp. 6116-6124.

* cited by examiner

METHOD AND APPARATUS FOR GENERATING TRAINING DATA FOR VQA SYSTEM, AND MEDIUM

CROSS-REFERENCE TO RELATED APPLICATION

The present application is based upon and claims priority to Chinese Patent Application No. 201811134016.6, filed on Sep. 27, 2018, the entirety contents of which are incorporated herein by reference.

FIELD

Embodiments of the present disclosure relate to a computer field, and more particularly to a method and an apparatus for generating training data for a visual question answering system, and a computer readable storage medium.

BACKGROUND

The VQA system involves many fields such as computer vision, natural language processing and knowledge representation (KR), and has become a hotspot in artificial intelligence research. For a given image, the VQA system is able to answer questions related to the image. That is, the VQA system receives an image and a question for the image as inputs, and generates an answer to the natural language of the question as an output. Current VQA systems are typically implemented based on supervised machine learning methods, in which a large number of trained images and questions and answers related to the trained images are utilized as training data such that the trained model is able to answer questions based on the image content. The effect of this training method is directly dependent on the amount of the training data.

Currently, training data for the VQA system are typically obtained by manual labeling. For example, for a given training image, the labeling person asks a question for the image and labels the corresponding answer. This approach is costly, slow, and has limited training data. In addition, the labeling person typically raises questions directly related to the target object in the image, making the form of the questions in the training data simple, without involving more complex descriptions and inferences for the target object. Therefore, the trained model is often unable to achieve a deeper understanding of the image content and thus cannot answer complex inference questions for the image.

SUMMARY

In accordance with an example embodiment of the present disclosure, a scheme for generating training data for a VQA system is provided.

In embodiments of the present disclosure, a method for generating training data for a VQA system is provided. The method includes: obtaining a first set of training data of the visual question answering system, the first set of training data comprising a first question for an image in the visual question answering system and a first answer corresponding to the first question; obtaining information related to the image; and generating a second question corresponding to the first answer based on the information to obtain a second set of training data for the image in the visual question answering system, the second set of training data comprising the second question and the first answer.

In embodiments of the present disclosure, an apparatus for generating training data in a VQA system is provided. The apparatus includes: a first obtaining module, configured to obtain a first set of training data of the visual question answering system, the first set of training data comprising a first question for an image in the visual question answering system and a first answer corresponding to the first question. The apparatus also includes a second obtaining module, configured to obtain information related to the image. The apparatus also includes a question generating module, configured to generate a second question corresponding to the first answer based on the information to obtain a second set of training data for the image in the visual question answering system, the second set of training data comprising the second question and the first answer.

In embodiment of the present disclosure, there is provided a computer-readable storage medium having a computer program stored thereon, the computer program being executed by a processor to implement a method for generating training data in a VQA system according to the embodiments of the present disclosure.

It should be understood that the content described in the Summary of the Invention is not intended to limit the key or important features of the embodiments of the present disclosure, and is not intended to limit the scope of the disclosure. Other features of the present disclosure will be readily understood by the following description.

BRIEF DESCRIPTION OF THE DRAWINGS

The above and other features, advantages and aspects of various embodiments of the present disclosure will become more apparent with reference to the figures and following detail descriptions. In the drawings, the same or similar reference numerals indicate the same or similar elements, in which.

DETAILED DESCRIPTION

Embodiments of the present disclosure will be described in more detail below with reference to the accompanying drawings. Although certain embodiments of the present disclosure are shown in the drawings, it is understood that the invention may be embodied in various forms and should not be construed as limited to the embodiments set forth herein. A more complete and complete understanding of the present disclosure. The drawings and embodiments of the present disclosure are to be considered as illustrative only and not limiting the scope of the disclosure.

In the description of the embodiments of the present disclosure, the term "comprise" and the like should be understood as inclusive, i.e., "including but not limited to". The term "based on" should be understood to mean "partially based on". The term "one embodiment" or "an embodiment" should be taken to mean "at least one embodiment". The terms "first", "second" and the like may refer to different or identical objects. Other explicit and implicit definitions may also be included below.

As described above, in the conventional solutions, training data for a VQA system is usually obtained by manual labeling. For example, for a given training image, the labeling person asks a question for the image and labels the corresponding answer. This approach is costly, slow, and has limited training data. In addition, the labeling person typically raises questions directly related to the target object in the image, making the form of the questions in the training data simple, without involving more complex descriptions and inferences for the target object. Therefore, the trained model is often unable to achieve a deeper understanding of the image content and thus cannot answer complex inference questions for the image.

In accordance with an embodiment of the present disclosure, a solution for generating training data for a VQA system is presented. The solution automatically generates training data with inference questions based on the training data with simple questions manually labeled in the original training data set by using object relations and object attributes which are pre-labeled for the training image. In this way, a large amount of training data for the VQA system are automatically, cost-effectively and efficiently obtained in accordance with this solution, thereby improving the efficiency of model training. In addition, since the obtained training data may include inference questions for the image, the ability of the VQA system to understand the image can be improved. This enables the trained VQA system to answer more complex inference questions for the image.

Figure 1:
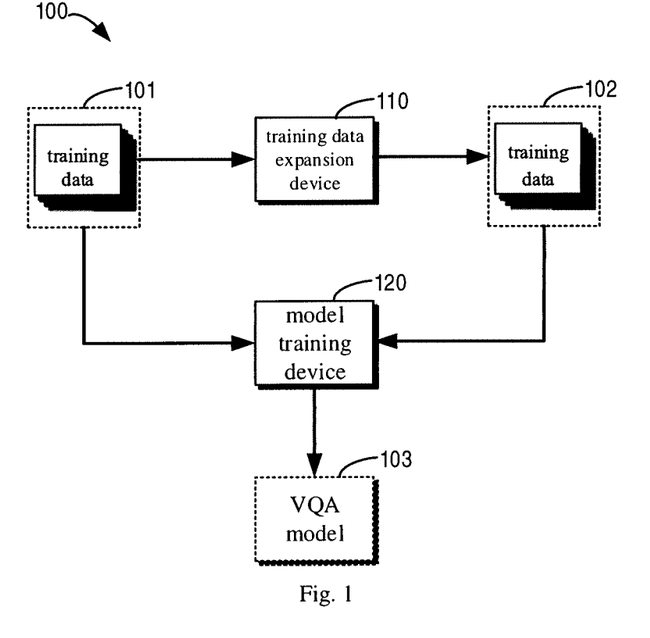
FIG. 1 illustrates a schematic diagram of an example environment in which embodiments of the present disclosure may be implemented.

Embodiments of the present disclosure will be specifically described below with reference to the drawings. FIG. 1 illustrates a schematic diagram of an example environment 100 in which embodiments of the present disclosure may be implemented. The example environment 100 illustrates a training process for a model of the VQA system (also referred to as a "VQA model"). In this context, the term "model" may learn the correlations between the corresponding inputs and outputs from the training data such that a corresponding output may be generated for a given input after the training is completed. It should be understood that the structure and function of the environment 100 are described in FIG. 1 for exemplary purposes only, without implying any limitation to the scope of the present disclosure. Embodiments of the present disclosure may also be applied to environments having different structures and/or functions.

As shown in FIG. 1, the example environment 100 may generally include a training data expansion device 110 and a model training device 120. In some embodiments, training data expansion device 110 and model training device 120 may be implemented in the same device. Alternatively, in other embodiments, the training data expansion device 110 and model training device 120 may be implemented in different devices, respectively.

In some embodiments, the training data expansion device 110 may obtain a pre-labeled training data set 101 for the VQA system. For example, the training data expansion device 110 may obtain the training data set 101 from an existing Visual Genome data set. The training data set 101 may include multiple sets of training data. For example, the first set of training data in the training data set 101 may include a question for a specific training image (hereinafter also referred to as a "first question") and an answer to the question (hereinafter also referred to as a "first answer").

In some embodiments, the training data expansion device 110 may generate another training data set 102 based on the training data set 101. For example, the training data expansion device 110 may generate a second set of training data corresponding to the first set of training data based on the first set of training data in the training data set 101. The second training data may include an inference question (hereinafter also referred to as a "second question") generated based on the first question and an answer to the inference question. For example, the inference question and the first question may have the same answer.

In some embodiments, as shown in FIG. 1, both the training data set 101 and the training data set 102 may be provided to the model training device 120 for training the VQA model 103. Additionally or alternatively, in some embodiments, only the training data set 102 may be provided to the model training device 120 for training the VQA model 103. The trained VQA model 103 may be used to answer questions posed about the inputted image.

Figure 2:
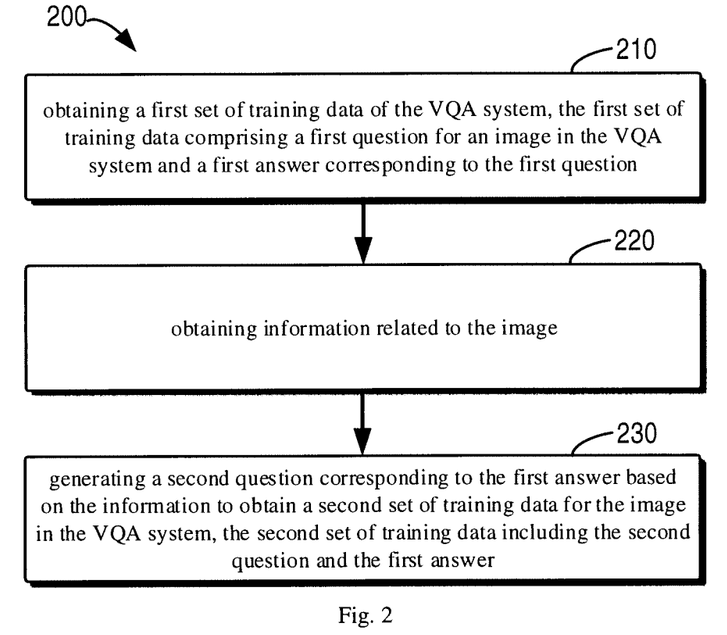
FIG. 2 illustrates a flowchart of a method for generating training data for a VQA system according to an embodiment of the present disclosure.

FIG. 2 illustrates a flowchart of a method 200 for generating training data for a VQA system according to an embodiment of the present disclosure. For example, the method 200 may be performed by the training data expansion device 110 as shown in FIG. 1. The method 200 will be described in detail below in conjunction with FIG. 1. It should be understood that the method 200 may also include additional blocks which are not shown and/or omitted. The scope of the disclosure is not limited in this aspect.

As shown in FIG. 2, at block 210, the training data expansion device 110 acquires a first set of training data for the VQA system. The first set of training data may include a first question for a training image for the VQA system and a first answer corresponding to the first question.

In some embodiments, the first question and the first answer in the first set of training data may be expressed in any natural language. Examples of natural language include, but are not limited to, Chinese, English, German, Spanish, French, and the like. In the following description, Chinese and English will be used as examples of natural language. However, it should be understood that this is for the purpose of illustration only, and is not intended to limit the scope of the disclosure. Embodiments of the present disclosure may be applied to a variety of different natural languages.

Figure 3:
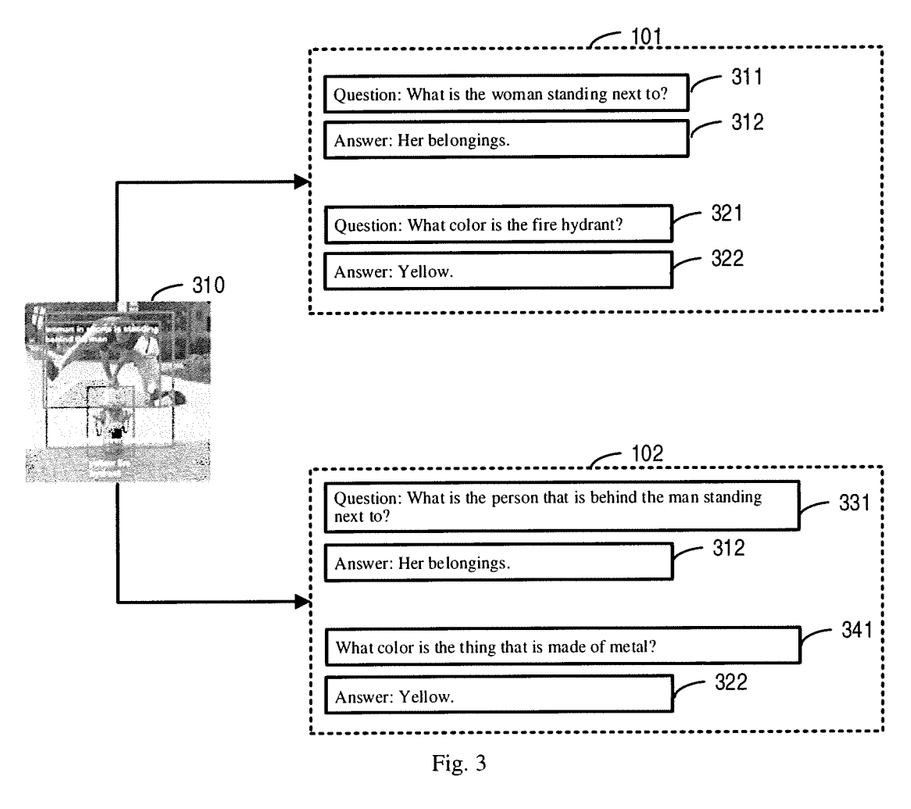
FIG. 3 illustrates a schematic diagram of example training data according to an embodiment of the present disclosure.

In some embodiments, the training data expansion device 110 may retrieve the first set of training data from the pre-labeled training data set 101. FIG. 3 illustrates a schematic diagram of example training data according to an embodiment of the present disclosure. FIG. 3 shows a training image 310 including a yellow fire hydrant, a man skipping the fire hydrant, and a woman wearing shorts standing behind the man. FIG. 3 also exemplarily shows a training data set 101 pre-labeled for the training image 310, including a question 311 and an answer 312 corresponding to the question 311, and a question 321 and an answer 322 corresponding to the question 321. As shown in FIG. 3, the question 311 is "What is the woman standing next to?", and the answer 312 is "Her belongings". The question 321 is "What color is the fire hydrant?", and the answer 322 is "Yellow". A combination of the question 311 and the answer 312, or a combination of the question 321 and answer the 322 as shown in FIG. 3 may be used as an example of the first set of training data.

At block 220, the training data expansion device 110 obtains information related to the training image.

In some embodiments, the training data expansion device 110 may acquire at least one of the following information pre-labeled for the image: first information identifying one or more objects in the image; second information identifying a relation among the one or more objects; and third information identifying a respective attribute of the one or more objects.

In some embodiments, these pre-labeled information (i.e., objects, relations, and attributes) for the image may be aligned to a predetermined semantic dictionary (e.g., a wordNet semantic dictionary). That is, the words used to describe the objects, relations, and attributes are all from the predetermined semantic dictionary to ensure that there is no ambiguity.

An image 310 as shown in FIG. 3 is taken as an example. In some embodiments, information related to the image 310 may identify objects in the image 310, such as the man, the woman, and the fire hydrant. Additionally or alternatively, the information associated with the image 310 may also identify relations between different objects in image 310, for example, the woman is behind the man (e.g., the relation may be represented as behind (woman, man)), the man jumps over the fire hydrant (e.g., the relation may be expressed as jumping_over (man, fire hydrant)). Additionally or alternatively, the information associated with the image 310 may also identify corresponding attributes of different objects in the image 310, for example, the hydrant is yellow (e.g., represented as color (fire hydrant, yellow)), the hydrant material is made of metal (e.g., represented as material (fire hydrant, metal)).

At block 230, the training data expansion device 110 generates the inference question (i.e., the second question) corresponding to the first answer based on the acquired information to obtain a second set of training data for the training image for the VQA system. The second set of training data may include a second question and a first answer.

Figure 4:
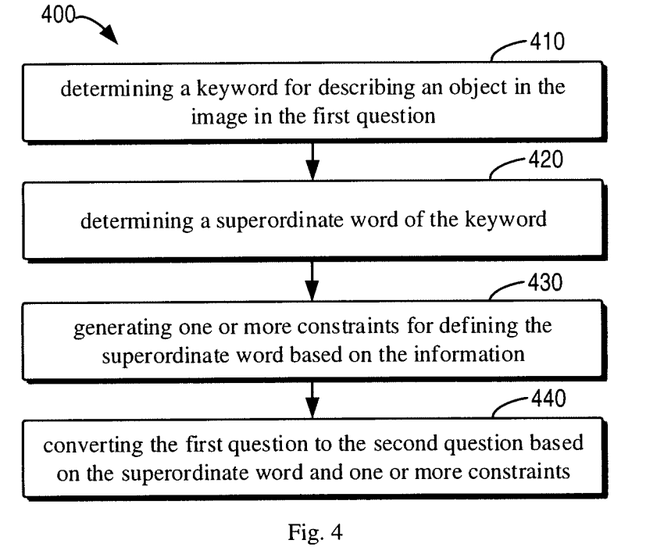
FIG. 4 illustrates a flowchart of a method for generating an inference question according to an embodiment of the present disclosure.

FIG. 4 illustrates a flow diagram of a method 400 for generating an inference problem in accordance with an embodiment of the present disclosure. The method 400 may be implemented as an example of the block 230 as shown in FIG. 2. For example, the method 400 may be performed by training data expansion device 110 as shown in FIG. 1. It should be understood that the method 400 may also include additional blocks which are not shown and/or omitted. The scope of the disclosure is not limited in this aspect.

At block 410, the training data expansion device 110 determines a keyword for describing an object in the image in the first question. Taking the question 311 shown in FIG. 3 as an example, for example, the keyword in the question 311 may be "the woman". Taking the question 321 shown in FIG. 3 as an example, for example, the keyword in the question 321 may be "the fire hydrant".

At block 420, the training data expansion device 110 determines a superordinate word of the keyword. In some embodiments, the training data expansion device 110 may determine the superordinate word of the keyword by querying in a predetermined semantic dictionary (e.g., a wordNet semantic dictionary). Taking the question 311 shown in FIG. 3 as an example, for example, the superordinate word of the keyword "the woman" may be "person". Taking the question 321 shown in FIG. 3 as an example, for example, the keyword "the fire hydrant" may be "thing".

At block 430, the training data expansion device 110 generates one or more constraints for defining the superordinate word, such that the superordinate word defined by the one or more constraints are capable of uniquely identifying the object in the image.

In some embodiments, constraints for defining an upper word may be generated based on relations between the objects. Taking the question 311 shown in FIG. 3 as an example, the keyword "the woman" has the superordinate word "person". As the only person behind the man in image 310 is the woman in image 310, the relation is_behind (woman, man) may be used to define the superordinate word to uniquely identify the woman in image 310.

In some embodiments, the constraints for defining the superordinate word may be generated based on attributes of the object. Taking the question 312 shown in FIG. 3 as an example, the keyword "the fire hydrant "is "thing". Assuming that only the fire hydrant is made of metal in the image 310, the attribute material (fire hydrant, metal) may be used to define the upper word "thing" to uniquely identify the fire hydrant.

In some embodiments, if the superordinate word constrained with a single constraint cannot uniquely identify the object in the image, the number of constraints can be increased until the superordinate word defined by the plurality of constraints may uniquely identify the object in the image. For example, the plurality of constraints may include constraints generated based on object relations and/or constraints generated based on object attributes.

Additionally or alternatively, in some embodiments, the maximum number of constraints used to define the superordinate word may be pre-set to ensure that the number of generated constraints does not exceed the maximum number. This ensures that the resulting inference questions are not overly complex. For example, assume that the set maximum number of constraints is K (where K is a natural number). In some embodiments, when the training data expansion device 110 determines that more than K constraints must be used to define a superordinate word to uniquely identify the object in the image, the generation of the constraint may be discarded and the keyword for describing the object may be replaced.

At block 440, the training data expansion device 110 converts the first question to the second question based on the superordinate word and one or more constraints. In some embodiments, the training data expansion device 110 may use the superordinate word defined by the one or more constraints to replace the keyword in the first question to obtain the second question.

For example, FIG. 3 illustrates an example training data set 102 generated based on an example training data set 101, in which an inference question 331 "What is the person that is behind the man standing next to?" which is converted from the question 311 is included, and "the person that is behind the man" is used to replace the "the woman" in the question 311. For example, the answer to question 331 is still the answer 312 "Her belongings". The training data set 102 also includes an inference question 341 "What color is the thing that is made of metal?" converted from the question 321, and "the thing that is made of metal" is used to replace the "fire hydrant" in question 321. For example, the answer to question 341 is still the answer 322 "yellow".

As can be seen from the above description, in accordance with an embodiment of the present disclosure, training data with inference questions may be generated based on the training data with simple questions manually labeled in the original training data set by using object relations and object attributes which are pre-labeled for the training image. In this way, a large amount of training data for the VQA system are automatically, cost-effectively and efficiently obtained in accordance with this solution, thereby improving the efficiency of model training. In addition, since the obtained training data may include inference questions for the image, the ability of the VQA system to understand the image can be improved. This enables the trained VQA system to answer more complex inference questions for the image.

Figure 5:
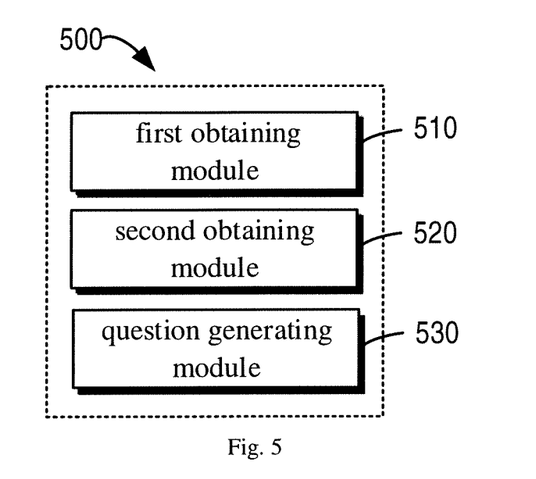
FIG. 5 illustrates a block diagram of an apparatus for generating training data for a VQA system according to an embodiment of the present disclosure.

Embodiments of the present disclosure also provide a corresponding apparatus for implementing the above methods or processes. FIG. 5 shows a schematic block diagram of an apparatus 500 for generating training data for a VQA system in accordance with an embodiment of the present disclosure. The apparatus 500 may be implemented at, for example, the training data expansion apparatus 110 of FIG. 1. As shown in FIG. 5, the apparatus 500 may include a first obtaining module 510, a second obtaining module 520, and a question generating module 530.

In some embodiments, the first obtaining module 510 is configured to acquire a first set of training data for a visual question answering system, in which the first set of training data includes a first question for an image in the visual question answering system and a first answer corresponding to the first question.

In some embodiments, the first obtaining module 510 is configured to obtain a first set of training data from a pre-labeled set of existing training data for a visual question answering system.

In some embodiments, the second obtaining module 520 is configured to acquire information related to the image.

In some embodiments, the second obtaining module 520 is configured to acquire at least one of the following information pre-labeled for the image: first information identifying one or more objects in the image; second information identifying a relation among the one or more objects; and third information identifying a respective attribute of the one or more objects.

In some embodiments, the question generating module 530 is configured to generate a second question corresponding to the first answer based on the information to obtain a second set of training data for the image in the visual question answering system, the second set of training data comprising the second question and the first answer.

In some embodiments, the problem generating module 530 includes: a first determining unit, configured to determine a keyword for describing an object in the image in the first question; a second determining unit, configured to determine a superordinate word of the keyword; a generating unit, configured to generate one or more constraints for defining the superordinate word based on the information, such that the superordinate word defined by the one or more constraints uniquely identifies the object in the image; and a converting unit, configured to convert the first question to the second question based on the superordinate word and the one or more constraints.

In some embodiments, the second determining unit is configured to determine a superordinate word of the keyword by querying a semantic dictionary.

In some embodiments, the acquired information identifies a relation between the object and other objects in the image, and the generating unit is configured to: generate at least one of the one or more constraints based on the relation.

In some embodiments, the acquired information identifies an attribute of the object, and the generating unit is configured to: generate at least one of the one or more constraints based on the attribute.

In some embodiments, the generating unit is configured to generate the one or more constraints based on the information, such that a number of the one or more constraints is lower than a predetermined threshold.

In some embodiments, the converting unit is configured to: replace the keyword in the first question with the superordinate word defined by the one or more constraints to obtain the second question It should be understood that each of the units recited in apparatus 500 corresponds to each step illustrated in the methods 200 and 400 described with reference to FIGS. 2-4, respectively. Moreover, the operations and features of the apparatus 500 and the units contained therein correspond to the operations and features described above in connection with FIGS. 2-4, and have the same effects, and details are not described again.

The units included in apparatus 500 may be implemented in a variety of manners, including software, hardware, firmware, or any combination thereof. In some embodiments, one or more units may be implemented using software and/or firmware, such as machine-executable instructions stored on a storage medium. In addition to or in lieu of machine-executable instructions, some or all of the units in apparatus 500 may be implemented, at least in part, by one or more hardware logic components. By way of examples but not limitations, exemplary types of hardware logic components that may be used include Field Programmable Gate Array (FPGA), Application Specific Integrated Circuit (ASIC), Application Specific Standard (ASSP), System on Chip (SOC), Complex Programmable Logic Device (CPLD), and so on.

The units shown in FIG. 5 may be partially or wholly implemented as hardware modules, software modules, firmware modules, or any combination thereof. In particular, in some embodiments, the processes, methods, or processes described above may be implemented by a storage system or hardware in a host corresponding to the storage system or other computing device independent of the storage system.

Figure 6:
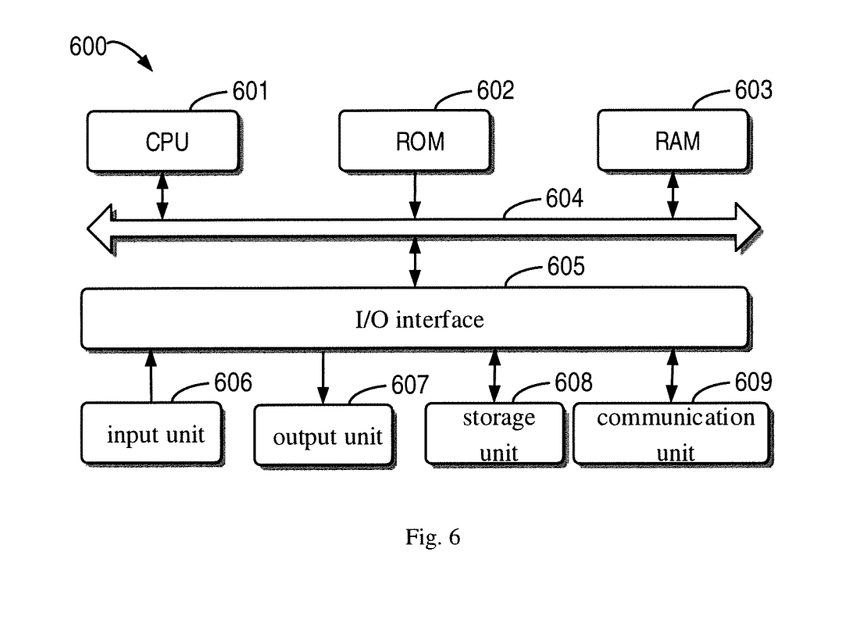
FIG. 6 illustrates a block diagram of a computing device in which embodiments of the present disclosure may be implemented.

FIG. 6 shows a schematic block diagram of an example device 600 that can be used to implement embodiments of the present disclosure. The device 600 may be used to implement the training data expansion device 110 and/or the model training device 120 as described in FIG. 1. As shown, the device 600 includes a central processing unit (CPU) 601 that can perform various appropriate actions and processes according to computer program instructions stored in a read only memory (ROM) 602 or loaded to a random access memory (RAM) 603 from a storage unit 608. In the RAM 603, various programs and data required for the operation of the device 600 can also be stored. The CPU 601, the ROM 602, and the RAM 603 are connected to each other through a bus 604. An input/output (I/O) interface 605 is also coupled to the bus 604.

A plurality of components in device 600 are coupled to the I/O interface 605, including: an input unit 606, such as a keyboard, mouse, etc.; an output unit 607, such as various types of displays, speakers, etc.; a storage unit 608, such as a disk, an optical disk, etc.; and a communication unit 609 such as a network card, a modem, a wireless communication transceiver, or the like. The communication unit 609 allows the device 600 to exchange information/data with other devices over a computer network such as the Internet and/or various telecommunication networks.

The processing unit 601 performs the various methods and processes described above, such as methods 200 and/or 400. For example, in some embodiments, methods 200 and/or 400 can be implemented as a computer software program that is tangibly embodied in a machine readable medium, such as storage unit 608. In some embodiments, some or all of the computer program can be loaded and/or installed onto device 600 via ROM 602 and/or communication unit 609. When a computer program is loaded into RAM 603 and executed by CPU 601, one or more of the steps of the methods 200 and/or 400 described above may be performed. Alternatively, in other embodiments, CPU 601 may be configured to perform methods 200 and/or 400 by any other suitable means (e.g., by means of firmware).

The functions described above herein may be performed, at least in part, by one or more hardware logic components. For example, and without limitations, exemplary types of hardware logic components that may be used include: Field Programmable Gate Array (FPGA), Application Specific Integrated Circuit (ASIC), Application Specific Standard Product (ASSP), System on System (SOC), Load Programmable Logic Device (CPLD) and the like.

Program code for implementing the methods of the present disclosure may be written in any combination of one or more programming languages. The program code may be provided to a general purpose computer, a special purpose computer or a processor or controller of other programmable data processing apparatus such that the program code, when executed by the processor or controller, causes the functions/operation specified in the flowcharts and/or block diagrams being implemented. The program code may execute entirely on a machine, partly on a machine, partly on a machine or on a remote machine or entirely on a remote machine or a server as a part of a stand-alone software package.

In the context of the present disclosure, a machine-readable medium may be a tangible medium that can contain or store a program for use by or in connection with an instruction execution system, apparatus, or device. The machine readable medium can be a machine readable signal medium or a machine readable storage medium. A machine-readable medium can include, but is not limited to, an electronic, magnetic, optical, electromagnetic, infrared, or semiconductor system, apparatus, or device, or any suitable combination of the foregoing. More specific examples of machine readable storage media may include electrical connections based on one or more wires, a portable computer disk, a hard disk, a random access memory (RAM), a read only memory (ROM), an erasable programmable read only memory (EPROM or flash memory), optical fiber, compact disk read only memory (CD-ROM), optical storage device, magnetic storage device, or any suitable combination of the foregoing.

In addition, although the operations are depicted in a particular order, this should be understood to require that such operations are performed in the particular order shown or in the order of the order, or that all illustrated operations should be performed to achieve the desired results. Multitasking and parallel processing may be advantageous in certain circumstances. Likewise, although several specific implementation details are included in the above discussion, these should not be construed as limiting the scope of the disclosure. Certain features that are described in the context of separate embodiments can also be implemented in combination in a single implementation. Conversely, various features that are described in the context of a single implementation can be implemented in a plurality of implementations, either individually or in any suitable sub-combination.

Although the subject matter has been described in language specific to structural features and/or methodological acts, it should be understood that the subject matter defined in the appended claims is not necessarily limited to the specific features or acts described. Instead, the specific features and acts described above are merely exemplary forms of implementing the claims.

What is claimed is:

1. A computer-implemented method for a visual question answering system, comprising:
    obtaining a first set of training data of the visual question answering system, the first set of training data comprising a first question for an image in the visual question answering system and a first answer corresponding to the first question;
    obtaining information related to the image;
    generating a second question corresponding to the first answer based on the information to obtain a second set of training data for the image in the visual question answering system, the second set of training data comprising the second question and the first answer; and
    training the visual question answering system with the first set of training data and the second set of training data, to obtain a target visual question answering system which provides an answer for a complex question of a target image;
    wherein generating the second question comprises:
    determining a keyword for describing an object in the image in the first question;
    determining a superordinate word of the keyword;
    generating one or more constraints for defining the superordinate word based on the information, such that the superordinate word defined by the one or more constraints uniquely identifies the object in the image; and
    converting the first question to the second question based on the superordinate word defined by the one or more constraints.

2. The method of claim 1, wherein obtaining the first set of training data comprises:
    obtaining the first set of training data from a pre-labeled set of existing training data for the visual question answering system.

3. The method of claim 1, wherein obtaining the information comprises:
    obtaining at least one of pre-labeled information for the image comprising:
    first information identifying one or more objects in the image;
    second information identifying a relation among the one or more objects; and
    third information identifying a respective attribute of the one or more objects.

4. The method of claim 1, wherein determining the superordinate word comprises:
    determining the superordinate word of the keyword by querying a semantic dictionary.

5. The method of claim 1, wherein the information identifies a relation between the object and other objects in the image, and generating the one or more constraints comprises:
    generating at least one of the one or more constraints based on the relation.

6. The method of claim 1, wherein the information identifies an attribute of the object, and generating the one or more constraints comprises:
    generating at least one of the one or more constraints based on the attribute.

7. The method of claim 1, wherein generating the one or more constraints comprises:

generating the one or more constraints based on the information, such that a number of the one or more constraints is lower than a predetermined threshold.

8. The method of claim 1, wherein converting the first question to the second question comprises:
replacing the keyword in the first question with the superordinate word defined by the one or more constraints to obtain the second question.

9. An apparatus for a visual question answering system, comprising a processor and a memory storing executable instructions, wherein the processor is configured to:
obtain a first set of training data of the visual question answering system, the first set of training data comprising a first question for an image in the visual question answering system and a first answer corresponding to the first question;
obtain information related to the image;
generate a second question corresponding to the first answer based on the information to obtain a second set of training data for the image in the visual question answering system, the second set of training data comprising the second question and the first answer; and
train the visual question answering system with the first set of training data and the second set of training data, to obtain a target visual question answering system which provides an answer for a complex question of a target image;
wherein the processor generates the second question by performing acts of:
determining a keyword for describing an object in the image in the first question;
determining a superordinate word of the keyword;
generating one or more constraints for defining the superordinate word based on the information, such that the superordinate word defined by the one or more constraints uniquely identifies the object in the image; and
converting the first question to the second question based on the superordinate word defined by the one or more constraints.

10. The apparatus of claim 9, wherein the processor obtains the first set of training data by performing an act of:
obtaining the first set of training data from a pre-labeled set of existing training data for the visual question answering system.

11. The apparatus of claim 9, wherein the processor obtains the information by performing an act of:
obtaining at least one of pre-labeled information for the image comprising:
first information identifying one or more objects in the image;
second information identifying a relation among the one or more objects; and
third information identifying a respective attribute of the one or more objects.

12. The apparatus of claim 9, wherein the processor determines the superordinate word by performing an act of:
determining the superordinate word of the keyword by querying a semantic dictionary.

13. The apparatus of claim 9, wherein the information identifies a relation between the object and other objects in the image, and the processor generates the one or more constraints by performing an act of:
generating at least one of the one or more constraints based on the relation.

14. The apparatus of claim 9, wherein the information identifies an attribute of the object, and the processor generates the one or more constraints by performing an act of:
generating at least one of the one or more constraints based on the attribute.

15. The apparatus of claim 9, wherein the processor generates the one or more constraints by performing an act of:
generating the one or more constraints based on the information, such that a number of the one or more constraints is lower than a predetermined threshold.

16. The apparatus of claim 9, wherein the processor converts the first question to the second question by performing an act of:
replacing the keyword in the first question with the superordinate word defined by the one or more constraints to obtain the second question.

17. A computer-readable storage medium having a computer program stored thereon, the computer program being executed by a processor to implement a method for a visual question answering system, comprising:
obtaining a first set of training data of the visual question answering system, the first set of training data comprising a first question for an image in the visual question answering system and a first answer corresponding to the first question;
obtaining information related to the image;
generating a second question corresponding to the first answer based on the information to obtain a second set of training data for the image in the visual question answering system, the second set of training data comprising the second question and the first answer; and
train the visual question answering system with the first set of training data and the second set of training data, to obtain a target visual question answering system which provides an answer for a complex question of a target image;
wherein the processor generates the second question by performing acts of:
determining a keyword for describing an object in the image in the first question;
determining a superordinate word of the keyword;
generating one or more constraints for defining the superordinate word based on the information, such that the superordinate word defined by the one or more constraints uniquely identifies the object in the image; and
converting the first question to the second question based on the superordinate word defined by the one or more constraints.

* * * * *